April 29, 1941.  W. B. HANNUM, SR., ET AL  2,240,296
CUTTING AND MEASURING DEVICE
Filed April 17, 1940
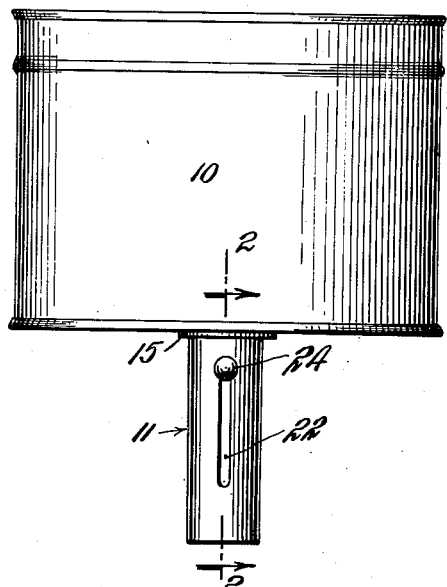
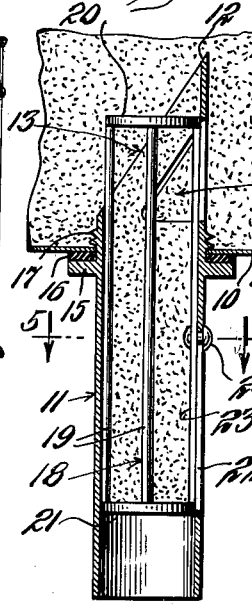
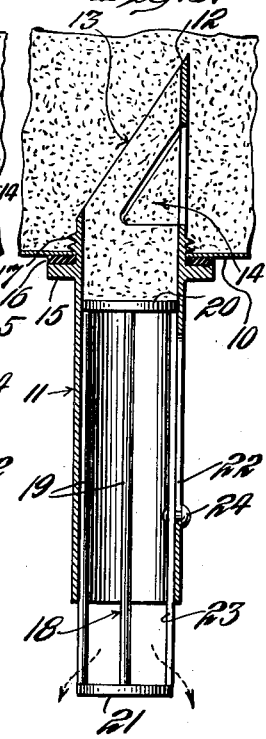
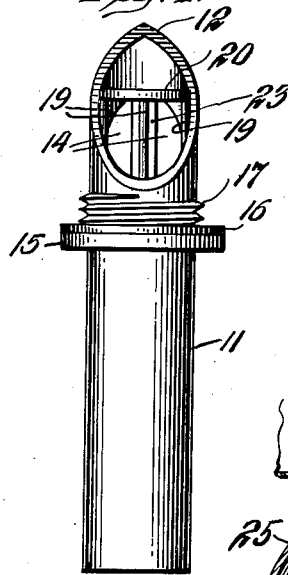
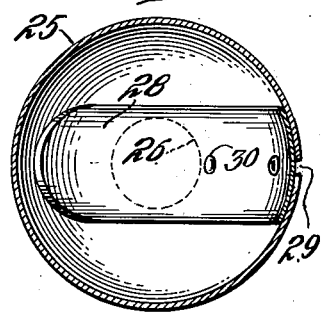
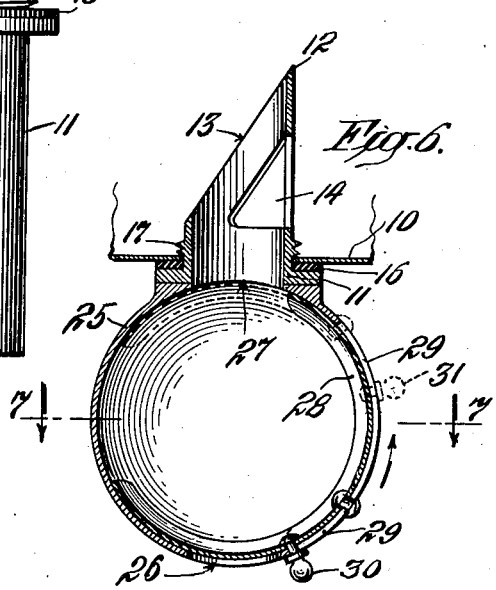
INVENTORS
WILLIAM B. HANNUM SR.
WILLIAM B. HANNUM JR.
BY
ATTORNEYS.

Patented Apr. 29, 1941

2,240,296

UNITED STATES PATENT OFFICE 2,240,296

CUTTING AND MEASURING DEVICE

William B. Hannum, Sr., Woodmere, and William B. Hannum, Jr., Jamaica, N. Y.

Application April 17, 1940, Serial No. 330,093

2 Claims. (Cl. 221—116)

This invention consists of a new and improved form of cutting and measuring device.

As is well known, a number of articles of food such for instance as coffee, are packed in airtight tins and it is desirable to keep such articles from the air as much as possible, especially coffee.

An object of the invention is to provide a cutting device which can be applied to the bottom or top of a coffee tin and so constructed that when the cutting device is pushed into a tin of coffee, the aperture will remain substantially air-tight.

A further object of the invention is to construct a cutting device having measuring means carried in the interior thereof.

A further object of the invention is to have a cutting device formed integral with a measuring device and means carried by the measuring device which alternately covers an opening in the cutting device and an opening in the measuring device.

Although the novel features which are believed to be characteristic of this invention will be more particularly pointed out in the claims appended hereto, the invention itself may be better understood by referring to the following description, taken with the accompanying drawing in which a particular embodiment of the invention has been set forth for the purpose of illustration.

In the drawing:

Fig. 1 is a perspective view of a tin of coffee showing the cutting device on the outside thereof.

Fig. 2 is a sectional view of a part of a coffee tin showing the position of a cutting and measuring device inserted in the coffee tin.

Fig. 3 is a sectional view showing the same device with the measuring member open.

Fig. 4 is a perspective view of the cutting device.

Fig. 5 is a sectional view of the cutting and measuring device taken on the line 5—5 of Fig. 2.

Fig. 6 is a sectional view of the cutting device and a modified form of measuring receptacle.

Fig. 7 is a sectional plan view of a modified form of measuring device showing a means of covering the respective openings therein.

The numeral 10 denotes a tin of coffee with the cutting member 11 inserted in the bottom thereof. This member 11 is preferably formed of steel or similar material and has a pointed opening 12 cut at an angle 13, shown in Figs. 2, 3, 4 and 6. The cutting member 11 also has openings 14 (Figs. 4 and 6) near the pointed end thereof to enable the coffee to pass into the member 11. The cutting member 11 also has a flange 15 to which is secured a gasket 16 of rubber or suitable packing material. The member 11 also has formed integral therewith threads 17 in order that when the cutting member 11 is forced into the tin it is turned around and the threads 17 in conjunction with the gasket 16 form an airtight joint at the place of entry of the cutting member into the tin.

The cutting member 11 carries on the interior thereof a circular measuring device 18. This measuring device is formed of four uprights 19, preferably made of metal, having a flat circular top 20 and a flat circular bottom 21. The measuring device is so constructed that it fits tightly into the cutting member 11 with just sufficient room to move up and down. At one side of the cutting device 11 is formed a slot 22. As will be noted in Fig. 5 one of the uprights 19 of the measuring device is made broader than the other three as shown at 23, Fig. 5, and of sufficient width to cover the inner side of the slot 22 and prevent the ingress of air therethrough and also prevent the coffee from falling out through the slot 22. On this wider upright 23 is placed a knob 24.

When the cutting member 11 is inserted into the can the knob 24 is at the uppermost position shown in Fig. 1. It is then moved down into the position shown in Fig. 3 and the coffee falls out through the spaces in the measuring member 18, between the uprights 19 and 23.

The modification shown in Figs. 6 and 7 has the same form of cutting member 11 with the openings therein, the threads and gasket, but permits of the withdrawal of a larger amount of coffee than the device shown in Figs. 2 and 3. In this form of device, there is rigidly attached to the cutting member 11, a circular or ball-like measuring member 25 having openings 26 and 27. On the inside of the circular member 25 there is a movable member 28 of sufficient width to cover the openings 26 and 27 and is curved as shown in Fig. 6 to correspond to the outline of the circular receptable 25. There is formed in the circular member 25 a slot 29 through which a knob 30 is secured to the member 28. When the cutting device is inserted into the can the sliding cover or member 29 is so positioned as to cover the opening 26 in the bottom of the circular receptacle 25 and the coffee then fills the entire receptacle. In order to obtain from the receptacle the amount of coffee therein the knob 30 is moved in the slot 29 to the position shown in dotted lines 31. The member 28 is then under the opening 27 in the cutting member 11 and no more coffee can come from the can and the coffee in the receptacle 25 falls out through the bottom opening 26. While the opening 26 is shown in the drawing directly under the cutting device 11, it will be understood that this opening 26 can be put at any desired part of the circular ball-like member 25.

Although a particular embodiment of the invention has been shown for purposes of illustration, it is to be understood that various changes and modifications may be made therein, as will readily appear to a person skilled in the art. The invention is to be limited only in accordance with the following claims when interpreted in view of the prior art.

What is claimed is:

1. A unitary device for use with a food or like container comprising a cutting portion and a measuring portion, openings in the measuring portion, the cutting portion of said device being tubular in form and coacting with an opening in the measuring portion and angularly pointed to cut into a container, a slot in the measuring portion, a sliding member on the interior of the measuring portion to coact with the openings in the measuring portion, a knob secured to the member and extending through the slot to position the member, and means carried on the outside of the cutting portion of the device to form a substantially airtight joint at the point of insertion into a container.

2. A unitary cutting and measuring device for use with a food or like container comprising a circular measuring member, openings in said member, a tubular angularly pointed cutting member positioned over one of the openings in said measuring member, said cutting member carrying means to form a substantially airtight joint at the point of insertion into a container, a movable member on the interior of the measuring member fitting closely to the interior wall thereof, and of sufficient width to cover the openings in said measuring member, a slot in the measuring member and means connected to the sliding member and extending through said slot to position the sliding member.

WILLIAM B. HANNUM, Sr.
WILLIAM B. HANNUM, Jr.